United States Patent
Nakajima

(10) Patent No.: US 8,396,497 B2
(45) Date of Patent: Mar. 12, 2013

(54) COMMUNICATION DEVICE AND METHOD FOR CONTROLLING COMMUNICATION DEVICE

(75) Inventor: Takafumi Nakajima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 12/778,901

(22) Filed: May 12, 2010

(65) Prior Publication Data

US 2010/0291954 A1 Nov. 18, 2010

(30) Foreign Application Priority Data

May 15, 2009 (JP) ................................. 2009-118974

(51) Int. Cl.
*H04B 7/00* (2006.01)
(52) U.S. Cl. ........ 455/507; 455/420; 455/464; 455/519; 455/411; 370/254
(58) Field of Classification Search .................. 455/41.2, 455/507, 502, 16, 13.1, 510, 517, 127.4, 455/150.1, 151.1, 151.4, 436, 561, 67.11, 455/458, 466, 411, 435.2, 519, 420, 464; 370/329, 350, 338, 328, 254; 709/248; 375/202, 375/356, 364
See application file for complete search history.

(56) References Cited

U.S. PATENT DOCUMENTS

| | | | |
|---|---|---|---|
| 6,014,406 A * | 1/2000 | Shida et al. | 375/133 |
| 7,408,438 B2 * | 8/2008 | Izumi | 340/2.1 |
| 2005/0174967 A1 * | 8/2005 | Morvan et al. | 370/329 |
| 2006/0111097 A1 * | 5/2006 | Fujii | 455/420 |
| 2006/0136603 A1 * | 6/2006 | Morvan et al. | 709/248 |
| 2007/0297347 A1 * | 12/2007 | Ikeda | 370/254 |
| 2010/0003979 A1 * | 1/2010 | Iwamura et al. | 455/436 |
| 2010/0182956 A1 * | 7/2010 | Moritomo et al. | 370/328 |
| 2011/0096756 A1 * | 4/2011 | Abramov et al. | 370/338 |
| 2012/0178421 A1 * | 7/2012 | Fujii | 455/411 |

FOREIGN PATENT DOCUMENTS

| | | |
|---|---|---|
| CN | 1855865 A | 11/2006 |
| JP | 2007-142958 A | 6/2007 |
| JP | 2009-038579 A | 2/2009 |
| KR | 1020070053639 A | 5/2007 |
| WO | 2009017036 A1 | 2/2009 |

OTHER PUBLICATIONS

Wi-Fi Alliance. Wi-Fi Certified for Wi-Fi Protected Setup: Easing the User Experience for Home and Small Office Wi-Fi Networks. Wi-Fi Alliance, 2009. Print.

* cited by examiner

*Primary Examiner* — Tan Trinh

(74) *Attorney, Agent, or Firm* — Canon USA Inc. IP Division

(57) ABSTRACT

When an instruction operation given by a user to start communication parameter setting is detected, an operation mode of a communication device is determined. According to the determined operation mode, it is determined whether to provide a communication parameter through another communication device operating in a base station mode, or provide a communication parameter directly by the communication device.

18 Claims, 12 Drawing Sheets

COMMUNICATION DEVICE AND METHOD FOR CONTROLLING COMMUNICATION DEVICE

BACKGROUND OF THE INVENTION

1. Field of the Invention

The present invention relates to a communication device capable of operating in both operation modes of a base station mode in which the device functions as a base station and a slave station mode in which the device functions as a slave station.

2. Description of the Related Art

In wireless communication represented by a wireless local area network (LAN) complying with IEEE 802.11 standard series, there are many setting items, which have to be set before use. For example, the setting items include communication parameters necessary for performing wireless communications such as an SSID as a network identifier, an encryption method, an encryption key, an authentication method, and an authentication key. Setting them by a user's manual input is very cumbersome.

In a non patent document (http://www.wi-fi.org/files/kc/20090123_Wi_Fi_Protected_Set up.pdf), a Wi-Fi Protected Setup (hereinafter, "WPS"), which is an industry standard of communication parameter automatic setting in an infrastructure mode in which a station (a slave station) communicates through an access point (a base station) is discussed. In currently commercially available products that support the WPS function, the base station mainly manages the communication parameters and directly provides the communication parameters to the slave station that requests acquisition of the communication parameters.

In the WPS, a device that manages and provides the communication parameters is called a registrar, and a wireless terminal that requests acquisition of the communication parameters and receives the communication parameters from the registrar is called an enrollee. In some products, an external device connected to the base station like a personal computer (PC) has a function of the registrar, and the communication parameters can be provided from the external device to the slave station that operates as the enrollee through the base station.

In Japanese Patent Application Laid-Open No. 2009-038579, a technique of setting the communication parameters in an ad-hoc mode in which the slave station directly communicates without involving the base station has been suggested. Specifically, a technique of receiving the communication parameters from another communication device and provides the received communication parameters to another communication device again has been discussed.

Further, in US Patent Publication No. 2007-0297347, an example, in which one communication device has both a base station function and a slave station function and the functions are switched to perform communications, has been discussed.

It is assumed that a plurality of wireless communication devices, which can automatically switch between the base station function and the slave station function, are present, and another device is participating as the slave station in a wireless network formed by a certain one device as the base station. Here, a case in which communication parameter automatic setting by the WPS is performed to newly bring a wireless communication device into the wireless network, is considered.

In this case, a user needs to instruct the newly participating device and the wireless communication device, which serves as a communication parameter providing device among a plurality of wireless communication devices already connected with the wireless network, to start communication parameter automatic setting.

In a typical wireless network, each wireless communication device has any one of the base station function and the slave station function, and a device which operates as the providing device is the base station or a device connected to the base station. Therefore, the user can recognize the newly participating device as a communication parameter receiving apparatus and the base station as the communication parameter providing device, and give a communication parameter automatic setting start instruction.

However, in the case in which a plurality of wireless communication devices connected to the wireless network can automatically switch the base station function and the slave station function, the user can not recognize which wireless communication device operates as the base station. As a result, there may occur a problem in which it is difficult to simply recognize which device operates as the communication parameter providing device, and therefore it is difficult to recognize a device, which is an automatic setting operation target.

SUMMARY OF THE INVENTION

The present invention is directed to a communication device and a method of controlling a communication device capable of easily performing communication parameter setting even in the communication device that can operate in both operation modes of the base station mode of functioning as the base station and the slave station mode of functioning as the slave station.

According to an aspect of the present invention, a communication device capable of operating in both operation modes of a base station mode functioning as a base station and a slave station mode functioning as a slave station includes a determination unit configured to determine an operation mode of the communication device when an instruction operation by a user to start communication parameter setting is detected, and a providing unit configured to provide a communication parameter to a device at the other end that requests provision of a communication parameter through a base station when the operation mode determined by the determination unit is the slave station mode, and to provide a communication parameter to the device at the other end directly by the communication device when it is determined that the operation mode determined by the determination unit is the base station mode.

According to another aspect of the present invention, a method for controlling a communication device capable of operating in both operation modes of a base station mode functioning as a base station and a slave station mode functioning as a slave station includes determining an operation mode of the communication device when an instruction operation given by a user to start communication parameter setting is detected, and providing, when the determined operation mode is the slave station mode, a communication parameter to a device at the other end, which requests provision of a communication parameter through a base station, and providing, when the determined operation mode is the base station mode, a communication parameter to the device at the other end directly by the communication device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
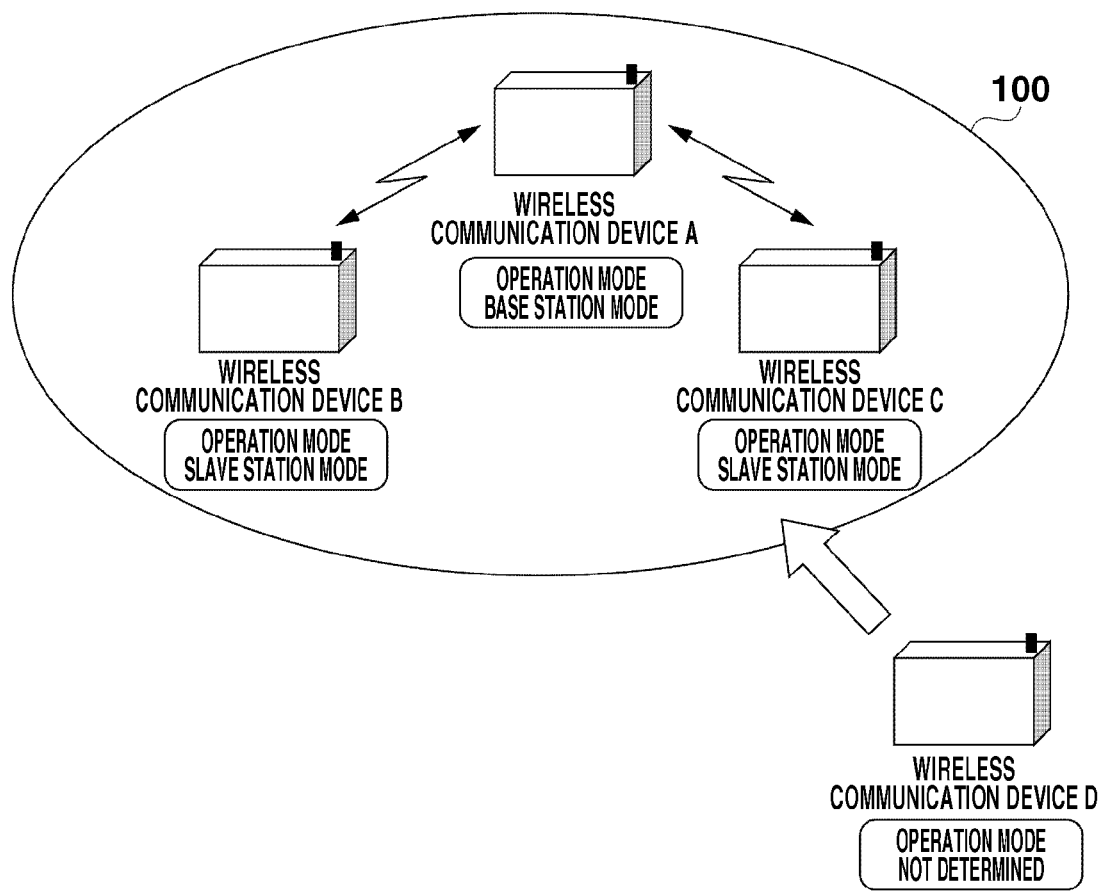
FIG. 1 illustrates a network configuration according to an exemplary embodiment of the present invention.

FIG. 1 is a network configuration diagram according to an exemplary embodiment of the present invention.

The network illustrated in FIG. 1 includes a wireless communication device A 101, a wireless communication device B 102, and a wireless communication device C 103. A wireless communication device D 104 is a terminal, which newly participates in the network.

In the present exemplary embodiment, it is assumed that the wireless communication device A, the wireless communication device B, the wireless communication device C, and the wireless communication device D have a communication function of an IEEE 802.11 wireless LAN (hereinafter, referred to as simply "wireless LAN"), respectively.

Further, the wireless communication device A, the wireless communication device B, the wireless communication device C, and the wireless communication device D have both an access point (hereinafter, a base station) function and a station (hereinafter, a slave station) function in the wireless LAN, and can operate as the base station or the slave station, respectively.

Hereinafter, the case of operating as the base station is called a base station mode, and the case of operating as the slave station is called a slave station mode. The wireless communication device A is operating in the base station mode and forms (constructs) a wireless network 100. The wireless communication device B and the wireless communication device C are operating in the slave station mode, respectively, and are participating in the wireless network 100. The operation mode of the wireless communication device D is not determined yet.

The wireless communication device A, the wireless communication device B, the wireless communication device C, and the wireless communication device D have a communication parameter automatic setting function, and can perform the WPS. In the present exemplary embodiment, it is assumed that each wireless communication device has both a communication parameter providing function and a communication parameter receiving function.

In other words, each communication device can operate as both the registrar and the enrollee of the WPS. In the following description, it is assumed that the wireless communication device performs an operation as the registrar of the WPS when it operates as the communication parameter providing device, and performs an operation as the enrollee of the WPS when it operates as the communication parameter receiving device.

Figure 2:
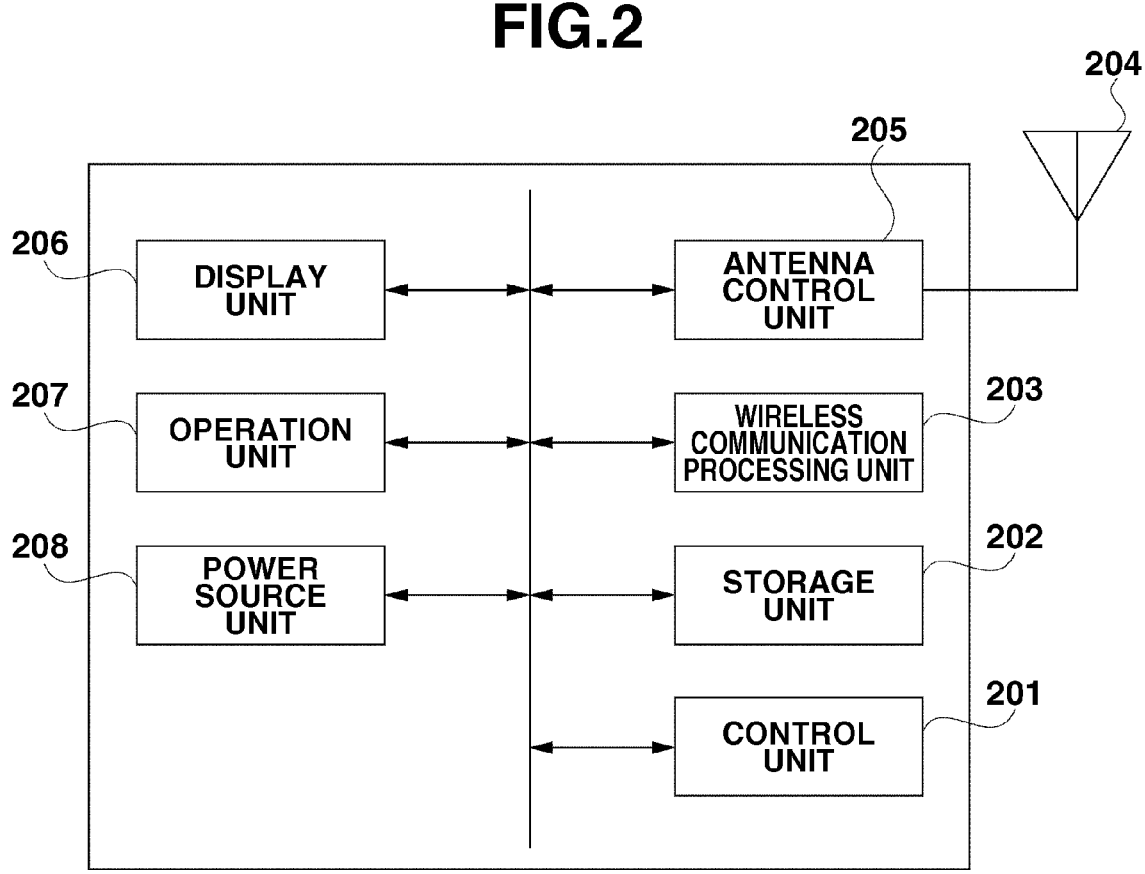
FIG. 2 is a block diagram illustrating a configuration of a wireless communication device.

FIG. 2 is a block diagram illustrating an example of a configuration of each wireless communication device.

The whole wireless communication device A 101 includes the following units. A control unit 201 controls the whole wireless communication device by executing a control program stored in a storage unit 202. The storage unit 202 stores the control program executed by the control unit 201 and various pieces of information such as the communication parameters. Various operations, which will be described below, are performed by the control unit 201 by executing the control program stored in the storage unit 202.

A wireless communication processing unit 203 performs wireless communications. An antenna 204 is connected to an antenna control unit 205. A display unit 206 performs various display functions such as a function of outputting visibly recognizable information like a liquid crystal display (LCD) or a light emitting diode (LED) or outputting a sound like a speaker.

The operation unit 207 includes a setting button for generating a trigger for starting communication parameter automatic setting and an operation button for performing entry of various pieces of information. The control unit 201 detects an operation of the setting button by an operation of the operation unit 207 by the user and starts a communication parameter setting operation, which will be described below. A power unit 208 supplies electrical power to the wireless communication device.

Figure 3:
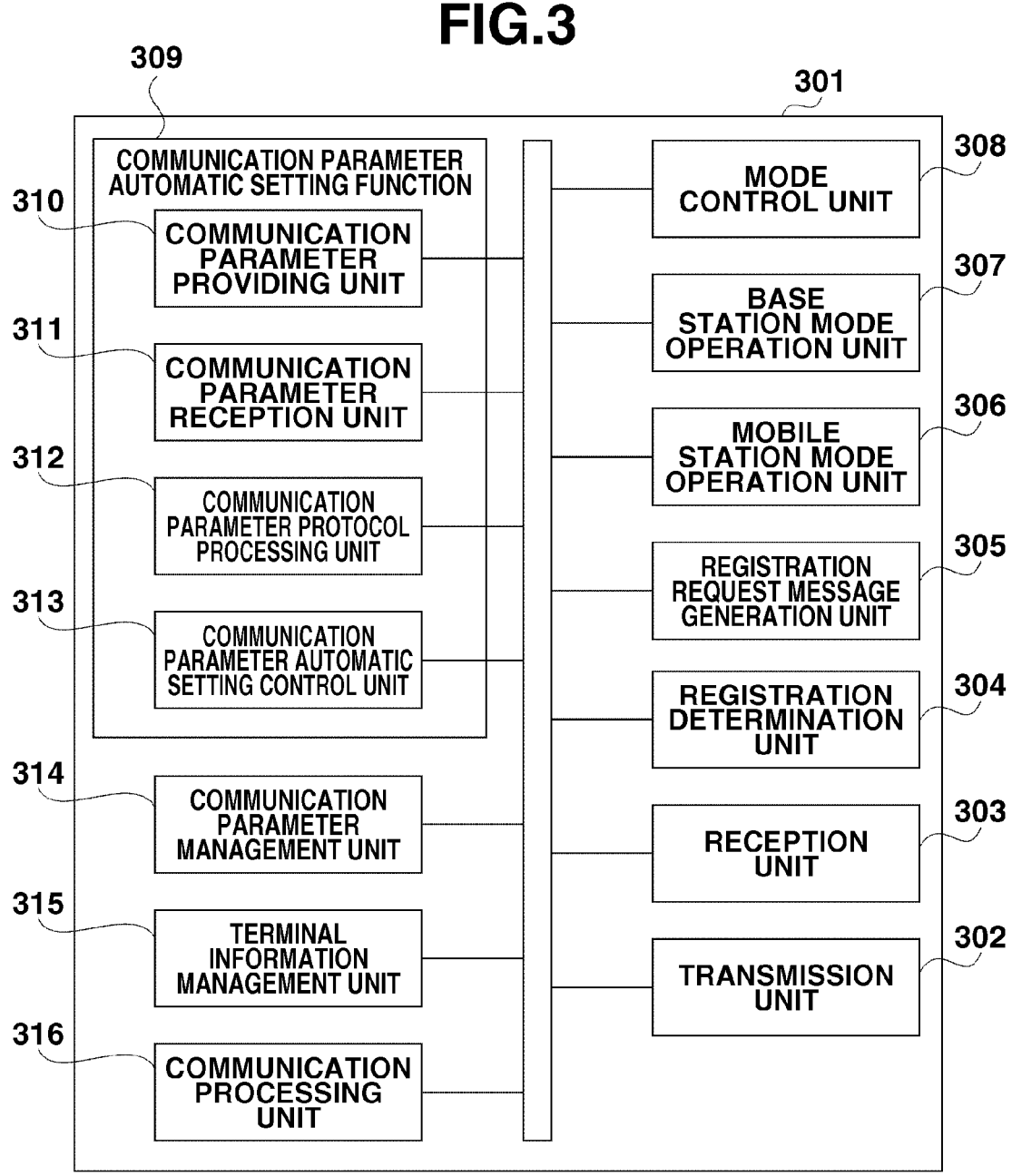
FIG. 3 is a block diagram illustrating a software functional block of a wireless communication device according to an exemplary embodiment of the present invention.

FIG. 3 is a block diagram illustrating an example of a configuration of a software functional block executed by each wireless communication device.

A software functional block 301 of the wireless communication device includes the following units. A packet transmission unit 302 functions to transmit packets related to various communications. A packet reception unit 303 functions to receive packets related to various communications.

A registration determination unit 304 performs registration determination when the wireless communication device that is operating in the base station mode receives a registration request message for requesting registration as the communication parameter providing device from another wireless communication device. The registration request message is a message for confirming whether the wireless communication device can be operated as the communication parameter providing device. A registration request message generation unit 305 generates the registration request message, which the wireless communication device that is operating in the slave station mode transmits to the wireless communication device that is operating in the base station mode.

A slave station mode operation unit 306 performs control for operating the wireless communication device in the slave station mode. A base station mode operation unit 307 performs control for operating the wireless communication device in the base station mode. A mode control unit 308 performs operation mode determination processing and mode switching control of the base station mode operation unit 307 and the slave station mode operation unit 306.

In the present exemplary embodiment, a communication parameter automatic setting functional block 309 performs automatic setting of the communication parameters necessary for performing wireless communications such as an SSID as a network identifier, an encryption method, an encryption key, an authentication method, and an authentication key. In the communication parameter automatic setting functional block 309, a communication parameter providing unit 310 provides the communication parameters to the device at the other end when the wireless communication device functions as the communication parameter providing device.

A communication parameter reception unit 311 receives the communication parameters transmitted from the communication parameter providing device when the wireless communication device functions as the communication parameter receiving device. A communication parameter protocol processing unit 312 processes various protocols for communication parameter automatic setting. A communication parameter automatic setting control unit 313 perform control as to whether to operate as the communication parameter providing device or the communication parameter receiving device, and starts or stops the communication parameter providing unit 310 and the communication parameter reception unit 311.

A communication parameter management unit 314 manages the communication parameter that is stored in the wireless communication device or newly generated. The communication parameter management unit 314 also performs management as to which communication parameter is to be provided. A terminal information management unit 315 manages terminal information related to the wireless communication device that is participating in the network constructed by the wireless communication device when the wireless communication device is operating in the base station mode.

The terminal information includes, for example, device information (a device type, a device name, a serial number, and a model number) and a MAC address. A notification processing unit 316 performs processing of notifying the user or the wireless communication device at the other end of an error, which occurs at the time of communication parameter setting processing.

All functional blocks have a software or hardware correlation with each other. The functional blocks described are one example, and a plurality of functional blocks may configure one functional block, or a certain functional block may be divided into blocks for performing a plurality of functions.

Processing when the wireless communication device D participates in the wireless network 100 according to the present exemplary embodiment will be described with reference to FIGS. 4 to 10.

Figure 4:
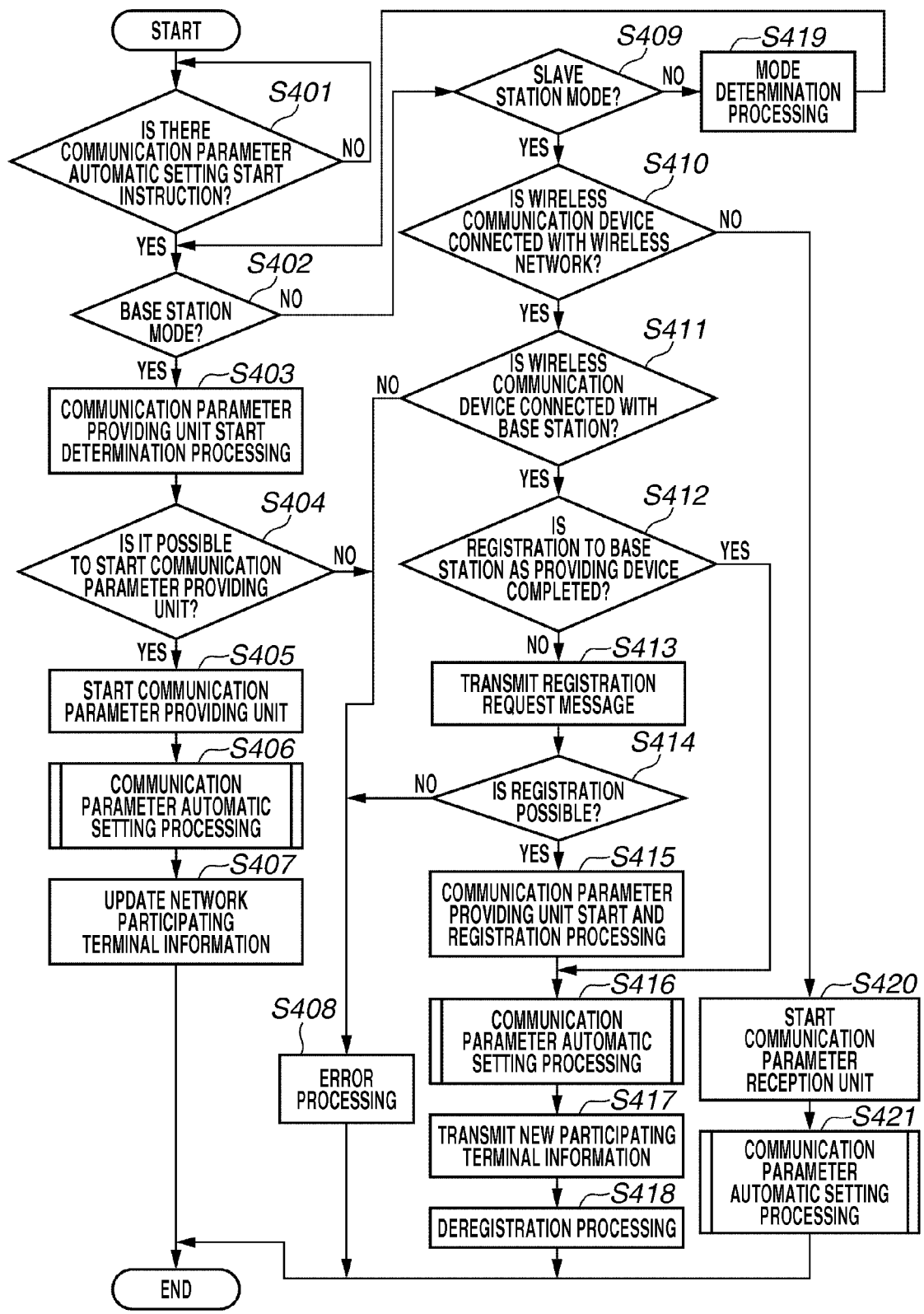
FIG. 4 is a flowchart illustrating communication parameter automatic setting processing executed by a wireless communication device according to a first exemplary embodiment.

FIG. 4 is a flowchart of processing executed by each wireless communication device according to the present exemplary embodiment.

When an operation of the setting button by the user to instruct a start of communication parameter automatic setting is detected (YES in step S401), in step S402 and step S409, the wireless communication device determines its own operation mode at that point of time. When it is determined that the operation mode is not determined yet (NO in step S402 and NO in step S409), the processing proceeds to step S419, and operation mode determination processing is performed therein.

In the operation mode determination processing, for example, it is determined whether any other wireless communication device that is operating in the base station mode is present around. For example, a method of determining that the device itself operates in the slave station mode when any other wireless communication device that is operating in the base station mode is detected, and determining that the device itself operates in the base station mode when any other wireless communication device that is operating in the base station mode is not detected, may be used.

When it is determined that the device itself operates in the base station mode (YES in step S402), the processing proceeds to step S403 and subsequent steps. However, when it is determined that the device itself operates in the slave station mode (YES in step S409), the processing is determined depending on whether the device itself is connected to the wireless network. When it is determined that the device itself is connected with the wireless network (YES in step S410), the processing proceeds to S411 and subsequent steps. However, when it is determined that the device itself is not connected with the wireless network (NO in step S410), the processing proceeds to step S420 and subsequent steps.

In other words, in the network configuration of FIG. 1, when the setting buttons of the respective wireless communication devices are operated, the wireless communication device A performs processing of step S403 and subsequent steps, the wireless communication devices B and C perform processing of step S411 and subsequent steps, and the wireless communication device D performs processing of step S420 and subsequent steps.

Figure 9:
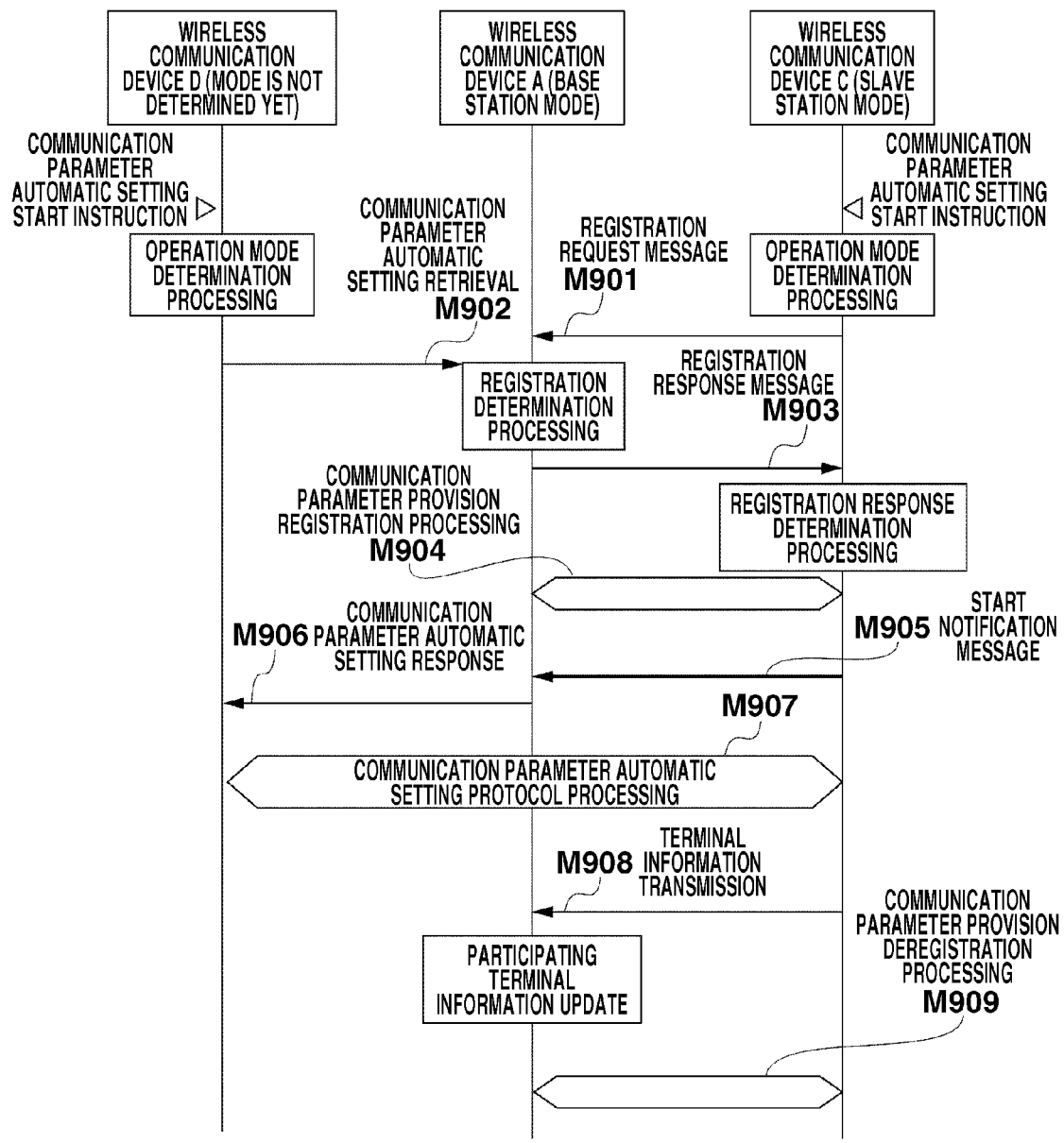
FIG. 9 illustrates a sequence when a communication parameter automatic setting start instruction is executed in a wireless communication device C and a wireless communication device D according to the first exemplary embodiment.

First, processing when a communication parameter automatic setting start instruction is given in the wireless communication device C and the wireless communication device D will be described with reference to a sequence diagram of FIG. 9. FIG. 9 is a sequence diagram when a communication parameter automatic setting start instruction is given in the wireless communication device C and the wireless communication device D.

When the communication parameter automatic setting start instruction is executed in the wireless communication device D (YES in step S401), the processing proceeds to step S402. In step S402, it is determined whether the wireless communication device D is operating in the base station mode. Since the operation mode of the wireless communication device D is not determined yet (NO in step S402), the processing proceeds to step S409. In step S409, it is determined whether the wireless communication device D is operating in the slave station mode.

Similarly, since the operation mode is not determined yet (NO in step S409), the processing proceeds to step S419. In step S419, a mode determination processing of the operation mode is performed. Details of the mode determination processing are not described in the present exemplary embodiment. In the present exemplary embodiment, it is assumed that the wireless communication device D operates in the slave station mode as the slave station that participates in the network.

In step S402 and step S409, operation mode determination is performed again. Since the operation mode of the wireless communication device D is the slave station mode (YES in step S409), the processing proceeds to step S410. In step S410, it is determined whether the wireless communication device D is connected with the wireless network.

Since the wireless communication device D is not connected with the wireless network yet (NO in step S410), the processing proceeds to step S420. In step S420, to operate as the receiving device that receives the communication parameter, the communication parameter reception unit is started. The processing proceeds to step S421. In step S421, the wireless communication device D performs the communication parameter automatic setting processing as the communication parameter receiving device.

The wireless communication device D, which has started the communication parameter automatic setting processing, first transmits a retrieval request (M902) for retrieving the wireless communication device at the other end, which can perform communication parameter automatic setting. Specifically, the wireless communication device D transmits the retrieval request (a probe request) in which information representing that communication parameter automatic setting is being performed is included and waits for reception of a retrieval response (a probe response) in which information representing that communication parameter automatic setting is being performed is included for a predetermined time.

Similarly, when the communication parameter automatic setting start instruction is given in the wireless communication device C (YES in step S401), the processing proceeds to step S402. In step S402, it is determined whether the wireless communication device C is operating in the base station mode. Since the wireless communication device C is operating in the slave station mode (NO in step S402), the processing proceeds to step S409. In step S409, it is determined that the wireless communication device C is operating in the slave station mode (YES in step S409), and the processing proceeds to step S410. In step S410, it is determined that the wireless communication device C is connected with the wireless network 100 (YES in step S410), the processing proceeds to step S411.

In step S411, it is determined whether the wireless communication device C is connected with the base station. Since the wireless communication device C is connected with the wireless communication device A, which is operating in the base station mode, it is determined that the wireless communication device C is connected with the base station (YES in step S411), and the processing proceeds to step S412. On the other hand, when the wireless communication device C is not connected with the base station (NO in step S411), in the communication parameter automatic setting processing according to the present exemplary embodiment, it is determined to be inoperable, and the processing proceeds to step S408. In step S408, error processing is performed.

The case in which the wireless communication device is connected with the wireless network 100 but not connected with the base station represents the case in which direct communication between the slave stations is being performed in the ad-hoc mode. In the present exemplary embodiment, this case is described as error processing, but the operation mode of the device itself may be changed to the base station mode to start communication parameter automatic setting.

In step S411, processing of determining whether the connected base station supports communication parameter automatic setting may be added. In this case, only when the base station supports communication parameter automatic setting, the processing proceeds to step S412, and when the base station does not support communication parameter automatic setting, the error processing in step S408 is performed.

In step S412, it is determined whether the wireless communication device C has been registered to the connected base station as the communication parameter providing device. At this time, since the wireless communication device C is not registered to the wireless communication device A yet as the communication parameter providing device (NO in step S412), the processing proceeds to step S413. On the other hand, when already registered (YES in step S412), the processing proceeds to step S416.

In step S413, the wireless communication device C transmits a registration request message (M901) to the wireless communication device A to confirm whether the wireless communication device C can be registered to the base station as the communication parameter providing device.

The processing flow when the wireless communication device (the wireless communication device A in the present exemplary embodiment) that is operating in the base station mode receives the registration request message from another wireless communication device (the wireless communication device C in the present exemplary embodiment) that is operating in the slave station mode will be described with reference to FIG. 5.

When the registration request message (M901) is received (YES in step S501), in step S502, the wireless communication device A performs registration determination processing as to whether the wireless communication device C as a transmission source can be registered as the communication parameter providing device.

Figure 6:
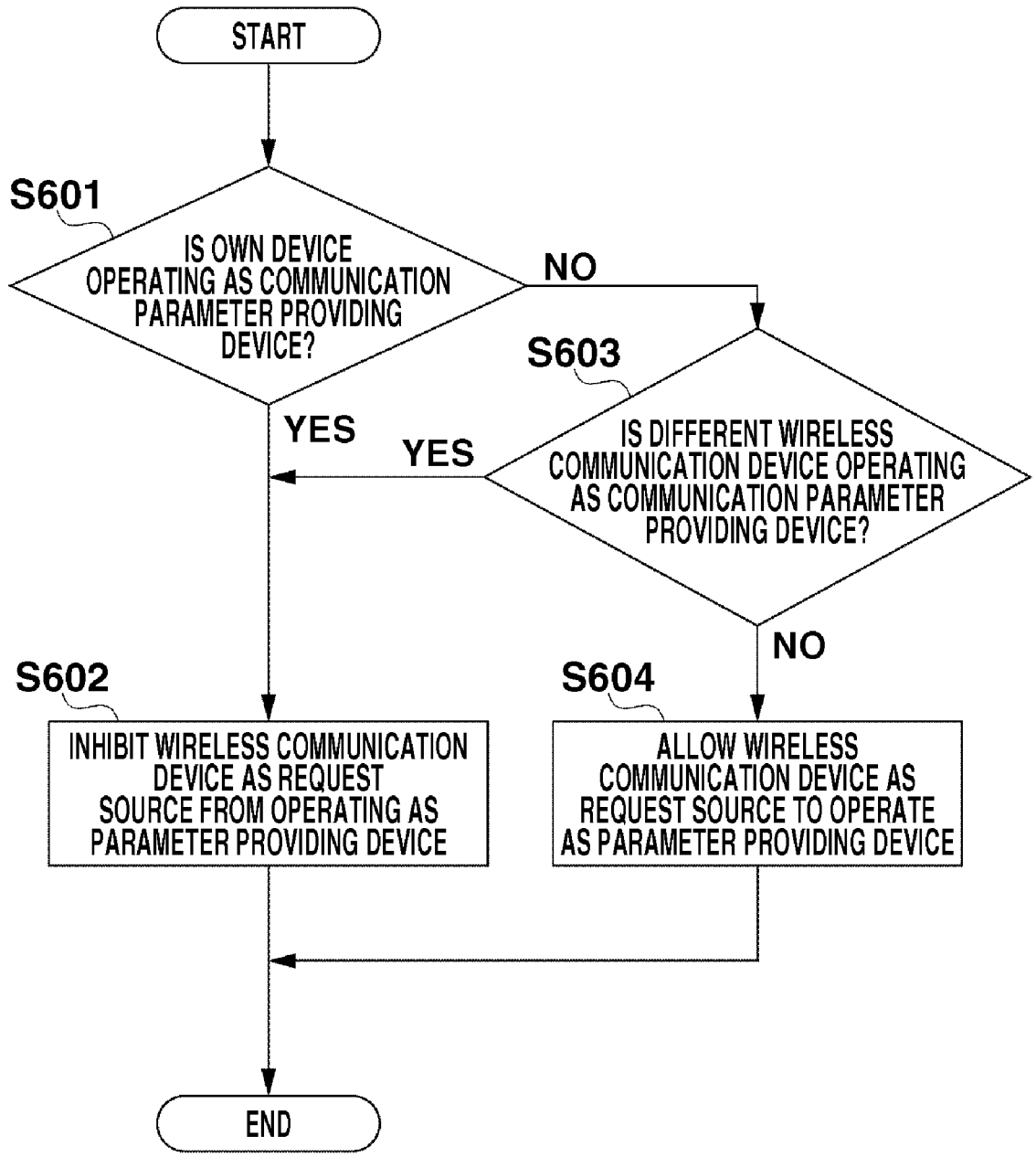
FIG. 6 is a flowchart illustrating registration determination processing executed by the wireless communication device A according to the first exemplary embodiment.

An example of the registration determination processing is illustrated in FIG. 6. In step S601, it is determined whether the wireless communication device A (the base station mode) is already operating as the communication parameter providing device. When the communication parameter setting start instruction is already given in the wireless communication device A and the wireless communication device A is operating as the communication parameter providing device (YES in step S601), the processing proceeds to step S602. On the other hand, when the wireless communication device A is not operating as the communication parameter providing device (NO in step S601), the processing proceeds to step S603.

In step S603, it is determined whether another wireless communication device (for example, the wireless communication device B) is already operating as the communication parameter providing device. When another wireless communication device is already operating as the communication parameter providing device (YES in step S603), the processing proceeds to step S602. On the other hand, when another wireless communication device is not operating as the communication parameter providing device yet (NO in step S603), the processing proceeds to step S604.

In step S602, the wireless communication device C is inhibited from operating as the communication parameter providing device. In other words, it is determined that the wireless communication device C cannot be registered as the communication parameter providing device. In step S604, since there is no device that is operating as the communication parameter providing device yet, the wireless communication device C is allowed to operate as the communication parameter providing device. In other words, it is determined that the wireless communication device C can be registered as the communication parameter providing device.

As described above, by performing the processing of FIG. 6, it is possible to limit the wireless communication device that operates as the communication parameter providing device on the network to one device.

The wireless communication device A releases the operation inhibition of step S602 at the following three timings. A first one is the case in which the device itself (the wireless communication device A in the present exemplary embodiment) completes processing as the communication parameter providing device, a second one is the case in which another wireless communication device (the wireless communication device B in the present exemplary embodiment) completes processing as the communication parameter providing device, and a third one is the case in which the wireless communication device as a request source (the wireless communication device C in the present exemplary embodiment) completes processing as the communication parameter providing device.

In the present exemplary embodiment, an example of the registration determination processing has been described, but the registration determination processing is not limited thereto. For example, determination may be performed by using the number of terminals that is participating in the wireless network. A maximum number of terminals that can participate in the wireless network is previously determined. When the number of participating terminals has already reached the maximum number of terminals, an operation as the communication parameter providing device is not allowed, and it is determined that registration is impossible. Therefore, it is possible to limit the number of wireless communication devices that can participate in the network.

Further, a display for urging the user to select whether to allow registration may be performed on the display unit 206 of the wireless communication device A, and it may be determined by the user's operation on the operation unit 207 whether to register the wireless communication device C as the communication parameter providing device. The registration determination processing is not limited thereto, and it is only necessary to determine whether to allow registration as the communication parameter providing device.

Figure 5:
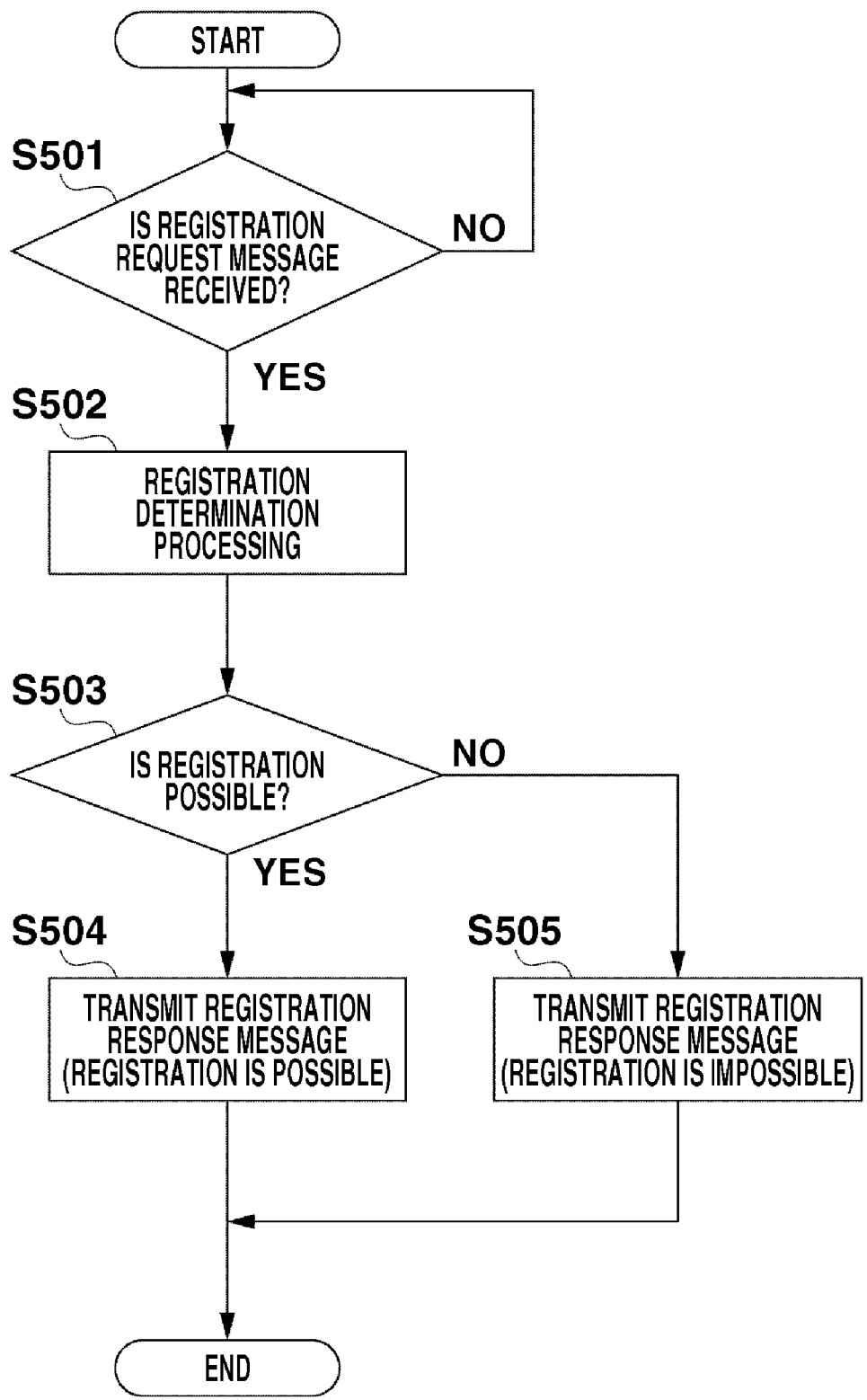
FIG. 5 is a flowchart illustrating processing when a wireless communication device A receives a registration request message according to the first exemplary embodiment.

Returning back to the description of FIG. 5, in step S503, when it is determined in the registration determination processing of step S502 that registration is possible (YES in step S503), the processing proceeds to step S504. On the other hand, when registration is impossible (NO in step S503), the processing proceeds to step S505.

In step S504, a registration response message (M903) representing that registration is possible is transmitted. In step S505, a registration response message (M903) representing that registration is impossible is transmitted. In the present exemplary embodiment, it is assumed that it is determined that the wireless communication device C can be registered as the communication parameter providing device.

Returning back to the description of FIG. 4, in step S414, the wireless communication device C confirms a content of the received registration response message (M903). When the registration response message representing that registration is possible is received (YES in step S414), the processing proceeds to step S415. When the registration response message representing that registration is impossible is received (NO in step S414), the processing proceeds to step S408, and the error processing is performed. In the error processing, notification representing that the communication parameter automatic setting processing is impossible may be performed.

In step S415, the wireless communication device C starts the communication parameter providing unit 310 and performs registration processing (M904) of registering to the wireless communication device A as the communication parameter providing device. The registration may be realized by transmitting a subscribe message of the WPS. When the registration processing is completed, the processing proceeds to step S416. In step S416, the wireless communication device C performs the communication parameter automatic setting processing as the communication parameter providing device. In the communication parameter automatic setting processing, the wireless communication device C provides the communication parameters to the wireless communication device D through the wireless communication device A that is operating in the base station mode.

First, the wireless communication device C transmits a start notification message representing a start of the communication parameter automatic setting processing to the wireless communication device A (M905). When the start notification message is received, the wireless communication device A transmits the retrieval response (M906) including information representing that communication parameter automatic setting is being performed in response to the communication parameter automatic setting retrieval request (M902) transmitted from the wireless communication device D. Even though not illustrated, before receiving the start notification message from the wireless communication device C, the wireless communication device A transmits the retrieval response including information representing that communication parameter automatic setting is not being performed in response to the retrieval request (M902) from the wireless communication device D.

The wireless communication device D receives the retrieval response including information representing that communication parameter automatic setting is being performed, and detects the wireless communication device A as the wireless communication device at the other end of communication parameter automatic setting. After the detection, communication parameter automatic setting protocol processing (M907) is performed, and the communication parameters are provided from the wireless communication device C to the wireless communication device D through the wireless communication device A.

The communication parameter automatic setting protocol processing (M907) is performed by a registration protocol of the WPS. The wireless communication device D is connected with the wireless network 100 by using the provided communication parameters.

The processing flow of determining the communication parameters, which are provided from the communication parameter providing device (the wireless communication device C in the present exemplary embodiment) to the communication parameter receiving device (the wireless communication device D in the present exemplary embodiment), will be described with reference to FIG. 8.

First, in step S801, the wireless communication device that operates as the communication parameter providing device determines whether it is already connected with the wireless network. The case in which the wireless communication device is already connected with the wireless network includes both the case in which the wireless communication device forms the wireless network as the base station and the case in which the wireless communication device participates in the wireless network as the slave station.

When the wireless communication device is already connected with the wireless network (YES in step S801), the processing proceeds to step S802. On the other hand, when the wireless communication device is not connected with the wireless network yet (NO in step S801), the processing proceeds to step S803. In step S802, the communication parameters of the connected wireless network are determined as the communication parameters to be provided. In step S803, newly generated communication parameters or previously stored communication parameters are determined as the communication parameters to be provided.

Here, the communication parameters to be provided are the communication parameters of the wireless network when the wireless communication device newly constructs the wireless network as the base station. In the case of the present exemplary embodiment, since the wireless communication device C is already connected with the wireless network 100, in step S802, the communication parameters of the wireless network 100 are determined as the communication parameters to be provided.

Here, during the communication parameter automatic setting protocol processing (M907), the wireless communication device C can acquire terminal information related to the wireless communication device D, which is a communication parameter providing destination. The terminal information includes, for example, device information (a device type, a device name, a serial number, and a model number), and a MAC address.

Returning back to the description of FIG. 4, when the wireless communication device C completes the communication parameter automatic setting processing, the processing proceeds to step S417. In step S417, device information and a MAC address of the wireless communication device D are transmitted to the wireless communication device A as the terminal information of the wireless communication device, which newly participates in the network (M908).

Figure 7:
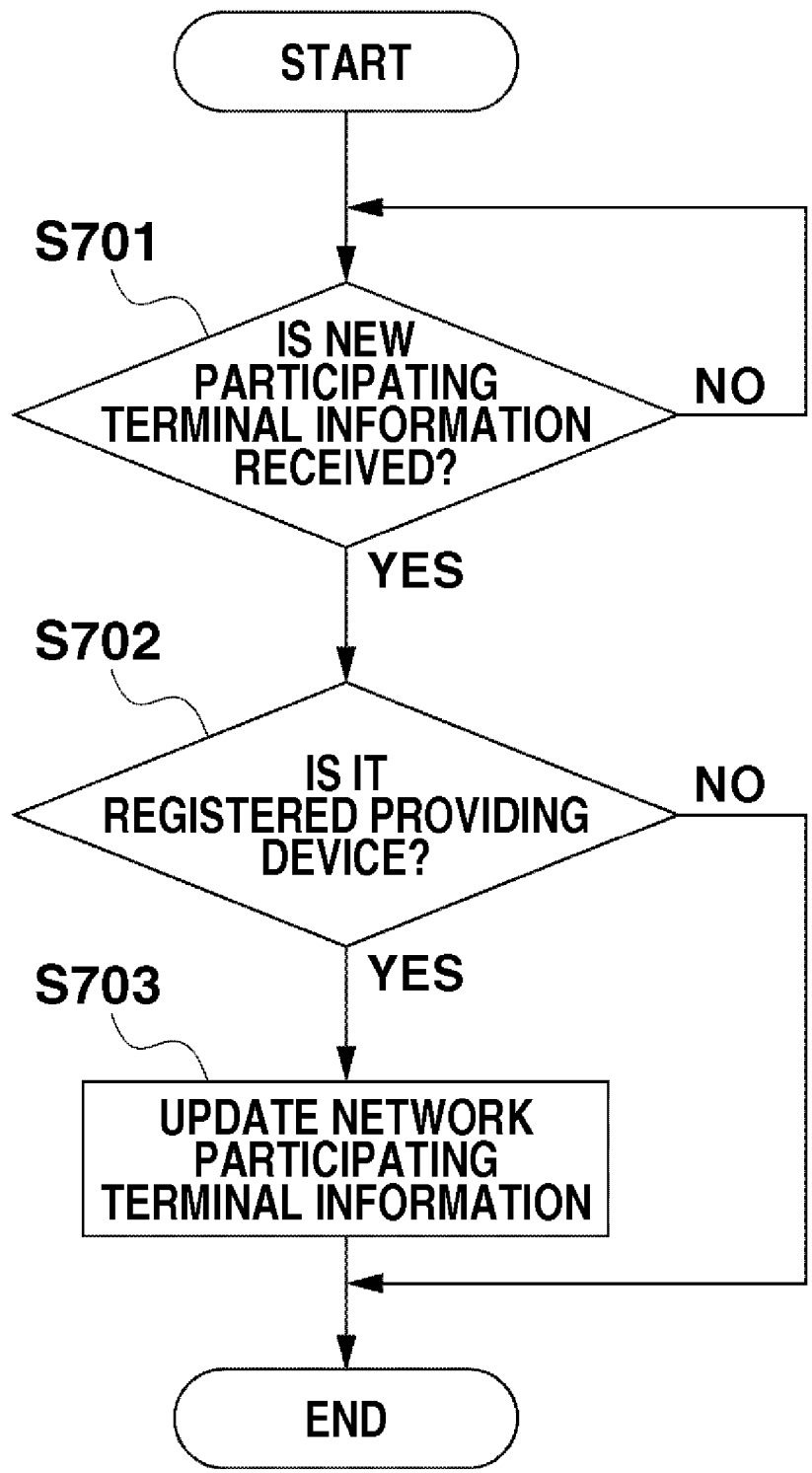
FIG. 7 is a flowchart illustrating processing when the wireless communication device A receives information of a newly participating terminal according to the first exemplary embodiment.

The processing flow when the wireless communication device A that is operating in the base station mode receives the terminal information of the wireless communication device (the wireless communication device D in the present exemplary embodiment) which newly participates in the network from another wireless communication device (the wireless communication device C in the present exemplary embodiment) will be described with reference to FIG. 7.

When the terminal information of the wireless communication device, which newly participates in the network, is received (YES in step S701), in step S702, the wireless communication device A determines whether the transmission source is the registered communication parameter providing device. When the transmission source is the registered communication parameter providing device (YES in step S702), the processing proceeds to step S703. In step S703, the terminal information of the wireless communication device, which is participating in the wireless network 100 managed by the device itself, is updated.

When the transmission source of the terminal information is the unregistered communication parameter providing device (NO in step S702), the received terminal information is discarded, and the processing is finished. As described above, when the wireless communication device has provided the communication parameters as the communication parameter providing device, even though participating in the wireless network as the slave station, the wireless communication device transmits the terminal information of the newly participating device, which is the communication parameter providing destination, to the base station at once. Since the base station updates the terminal information managed by itself based on the terminal information transmitted from the slave station, it is possible to manage information of the wireless communication device that is participating in the wireless network in real time.

Returning back to the description of FIG. 4, when the wireless communication device C finishes transmission of the terminal information of the wireless communication device D, which newly participates in the network, the processing proceeds to step S418, and deregistration processing (M909) of deregistering as the communication parameter providing device is performed. Specifically, a deregistration request message of deregistering as the communication parameter providing device is transmitted to the wireless communication device A, which is operating as the base station.

Figure 10:
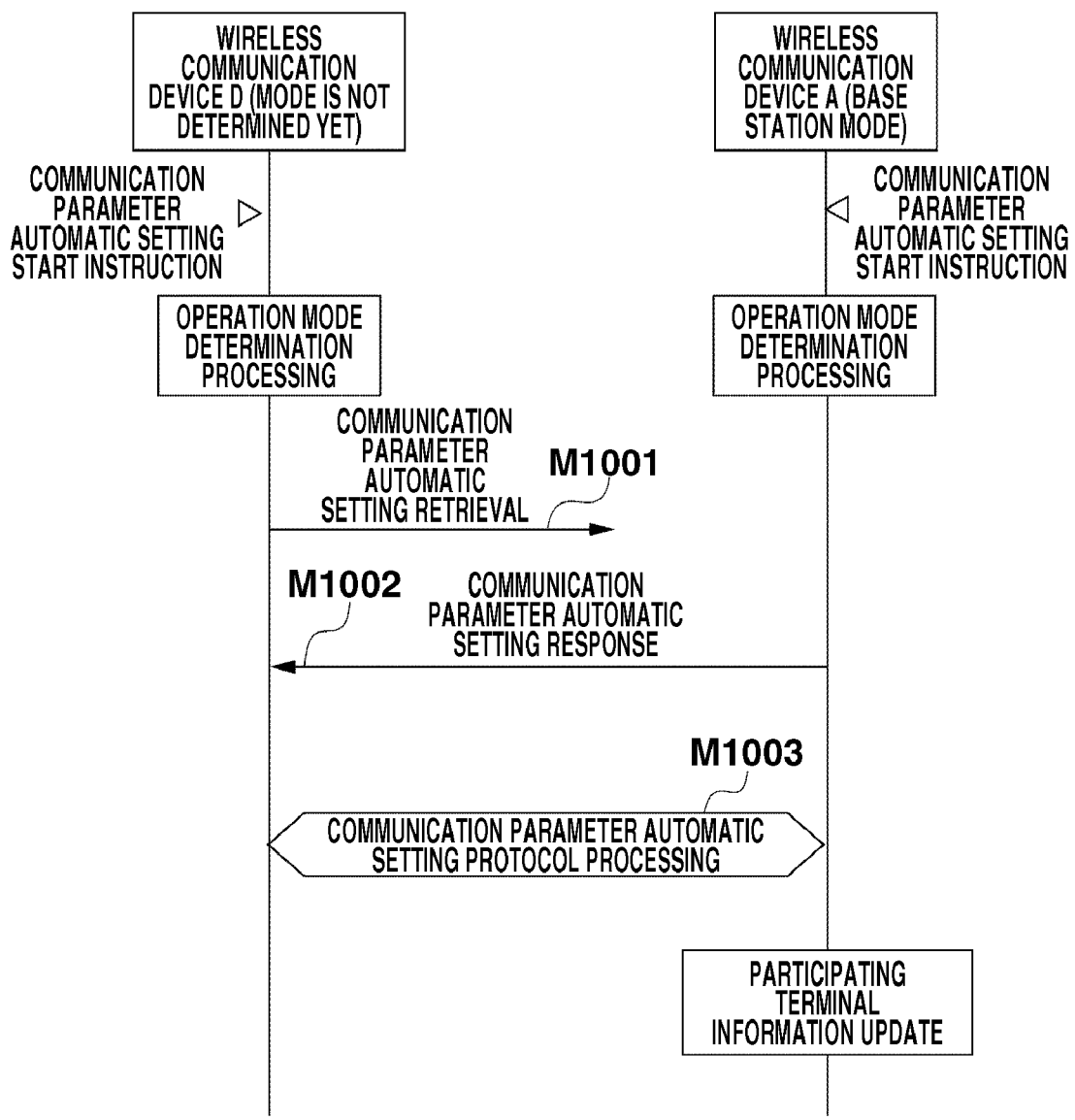
FIG. 10 illustrates a sequence when a communication parameter automatic setting start instruction is executed in the wireless communication device A and the wireless communication device D according to the first exemplary embodiment.

Next, processing when the communication parameter automatic setting start instruction is given in the wireless communication device A and the wireless communication device D will be described with reference to FIG. 10. FIG. 10 illustrates a sequence when the communication parameter automatic setting start instruction is given in the wireless communication device A and the wireless communication device D. Processing in the wireless communication device D is the same as the processing described above, and thus description thereof will not be repeated.

When the communication parameter automatic setting start instruction is given in the wireless communication device A (YES in step S401), the processing proceeds to step S402. In step S402, it is determined whether the wireless communication device A is operating in the base station mode. Since the wireless communication device A is operating in the base station mode (YES in step S402), the processing proceeds to step S403. In step S403, determination processing as to whether the device A can be started as the communication parameter providing device is performed.

In the determination processing, for example, it is confirmed whether a device, other than the device A, that is operating as the providing device is present. When there is no device that is operating as the providing device, it is determined that the device A can be started as the providing device. The determination processing is not limited thereto. In the present exemplary embodiment, it is assumed that the wireless communication device A can be started as the communication parameter providing device.

Next, when it is determined in step S404 that the communication parameter providing unit 310 can be started (YES in step S404), the processing proceeds to step S405. On the other hand, when it is determined that the communication parameter providing unit 310 cannot be started (NO in step S404), the processing proceeds to step S408, and the error processing is performed. In step S405, the communication parameter providing unit 310 of the device A is started, and the processing proceeds to step S406. In step S406, the communication parameter automatic setting processing in which the device A is set as the communication parameter providing device is performed.

The wireless communication device A that has started the communication parameter automatic setting processing transmits a retrieval response (M1002) including information which representing that the communication parameter automatic setting is being performed in response to a communication parameter automatic setting retrieval request (M1001) transmitted from the wireless communication device D.

The wireless communication device D receives the retrieval response including the information representing that communication parameter automatic setting is being performed, and detects the wireless communication device A as the wireless communication device at the other end of communication parameter automatic setting. After the detection, communication parameter automatic setting protocol processing (M1003) is performed, and the communication parameters are provided from the wireless communication device A to the wireless communication device D.

The communication parameter automatic setting protocol processing (M1003) is performed by the registration protocol of the WPS. The wireless communication device D is connected with the wireless network 100 by using the provided communication parameters.

Figure 8:
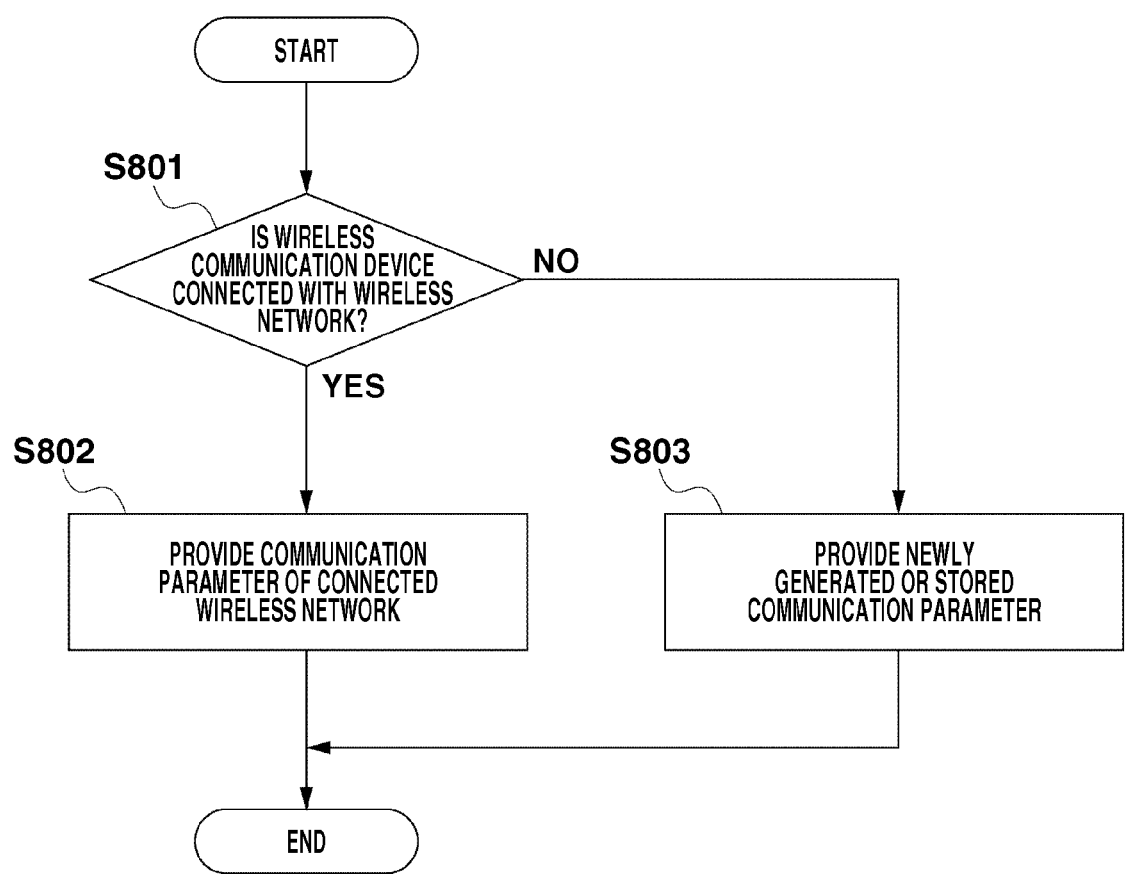
FIG. 8 is a flowchart illustrating processing of determining communication parameters to be provided through the wireless communication device as a communication parameter providing device according to the first exemplary embodiment.

The communication parameters to be provided are determined by the processing flow of FIG. 8. Since the wireless communication device A is constructing the wireless network 100 as the base station, in step S801, it is determined that the wireless communication device A is connected with the wireless network (YES in step S801). In step S802, the communication parameters of the wireless network 100 are determined as the communication parameters to be provided. When the wireless communication device A completes the communication parameter automatic setting processing, the processing proceeds to step S407.

In step S407, the terminal information of the wireless communication device, which is participating in the wireless network 100 managed by the wireless communication device A, is updated by using the terminal information of the wireless communication device D acquired through the communication parameter automatic setting protocol processing. Therefore, the wireless communication device A can appropriately manage the wireless communication device that is participating in the wireless network 100.

As described above, in the present exemplary embodiment, the wireless communication device that is connected with the wireless network 100 determines the operation mode of the device itself in response to the communication parameter automatic setting start instruction. When the wireless communication device is operating as the slave station, the communication parameters are provided through another wireless communication device that is operating as the base station. On the other hand, when the wireless communication device is operating as the base station, the wireless communication device directly provides the communication parameters.

As described above, according to the present exemplary embodiment, even though the user is not conscious of which wireless communication device in the wireless network is the communication parameter providing device, it is possible to perform the communication parameter automatic setting processing. In other words, the communication parameter automatic setting processing can be performed by executing the communication parameter start instruction in the wireless communication device, which newly participates in the network, and a certain wireless communication device within the wireless network. Therefore, the user's convenience can be improved.

In the above description, the wireless communication device D can operate as both the base station and the slave station, but the present invention can be applied to the case in which the wireless communication device D can operate as only the slave station. Further, in the above description, the wireless communication device D has both the providing function and the receiving function of the communication parameter automatic setting processing, but the present invention can be applied to the case in which the wireless communication device D has only the receiving function.

Further, in the above description, the wireless communication device C transmits the registration request message (M901) to the wireless communication device A, and performs the registration processing (M904) after receiving the response message (M903) representing that registration is possible. However, these pieces of processing may be performed together. In other words, when the registration request message (M901) is received from the wireless communication device C, the wireless communication device A may register the wireless communication device C as the communication parameter providing device.

It has been described above that the communication parameter automatic setting processing start notification message (M905) is transmitted after registration of the providing device. However, these pieces of processing may be performed together. More specifically, when the registration request message (M901) is received or when the registration processing (M904) is completed, the wireless communication device A may determine that the wireless communication device C has started the communication parameter automatic setting processing, and thus transmit the retrieval response of M906.

Further, it has been described above that the wireless communication device D that has started the communication parameter automatic setting processing retrieves the other end of communication parameter automatic setting by transmitting the retrieval request (M902 and M1001) and waiting for reception of the retrieval response (M906 and M1002) (an active scan). However, the method of retrieving the other end of communication parameter automatic setting is not limited thereto. For example, a method of waiting for reception of a beacon transmitted from the wireless communication device A that operates as the base station may be used (a passive scan).

When the start notification message (M905) is received from the wireless communication device C or when the setting start instruction operation is performed in the wireless communication device A, the wireless communication device A starts transmission of the beacon including information representing that the communication parameter automatic setting is being performed. Therefore, the wireless communication device D can detect the wireless communication device A as the other end of communication parameter automatic setting by waiting for reception of the beacon. Further, the retrieval in which the active scan and the passive scan are combined may be used.

In the first exemplary embodiment, the case in which the registration processing as the communication parameter providing device is performed after the communication parameter automatic setting start is instructed, has been described.

In a second exemplary embodiment, the case of performing the registration processing to the base station in advance is described. The network configuration (FIG. 1) and the configuration of each wireless communication device (FIGS. 2 and 3) are the same as in the first exemplary embodiment, and description thereof will not be repeated.

In the present exemplary embodiment, processing of until the wireless communication device D participates in the wireless network 100 after the communication parameter automatic setting processing is performed in the wireless communication device A and the wireless communication device C to form the wireless network 100, is described.

First, the wireless communication device A operates in the base station mode and constructs the wireless network 100, and the wireless communication device C performs communication parameter automatic setting in the slave station mode, and is connected with the wireless network 100. Next, the wireless communication device D attempts to be connected with the wireless network 100. At this time, it is assumed that the communication parameter automatic setting start instruction is given in the wireless communication device C and the wireless communication device D.

The series of processing is described with reference to FIGS. 5 to 8, and FIGS. 11 and 12.

Figure 11:
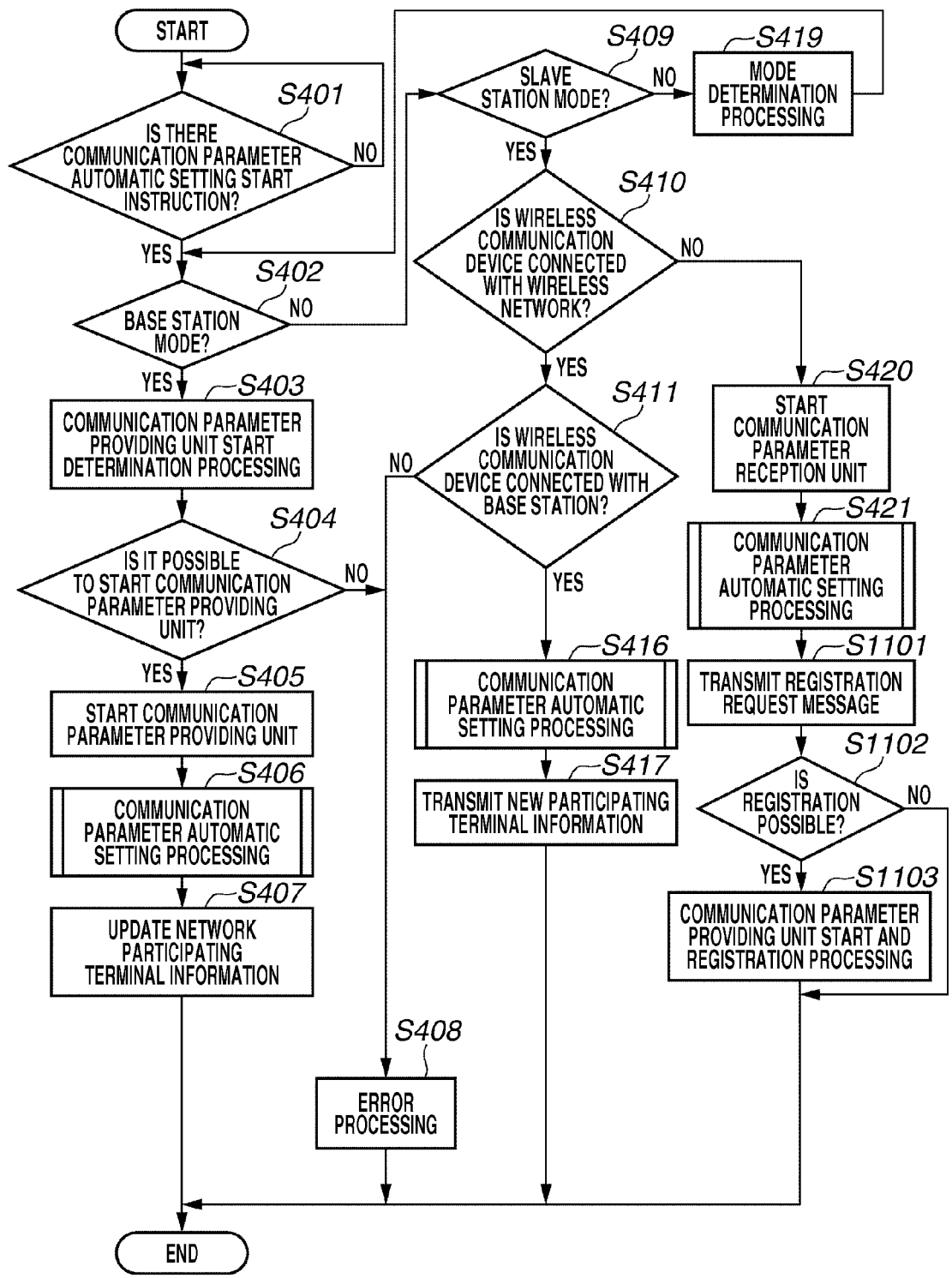
FIG. 11 is a flowchart illustrating communication parameter automatic setting processing executed by a wireless communication device according to a second exemplary embodiment.

FIG. 11 is a flowchart of each wireless communication device according to the present exemplary embodiment. The same processing as the flow of FIG. 4 is denoted by the same reference numeral. When FIG. 11 is compared to FIG. 4, the processing of step S412 to step S415 and step S418 is deleted, and processing of step S1101 to step S1103 is added subsequent to the processing of step S421.

Figure 12:
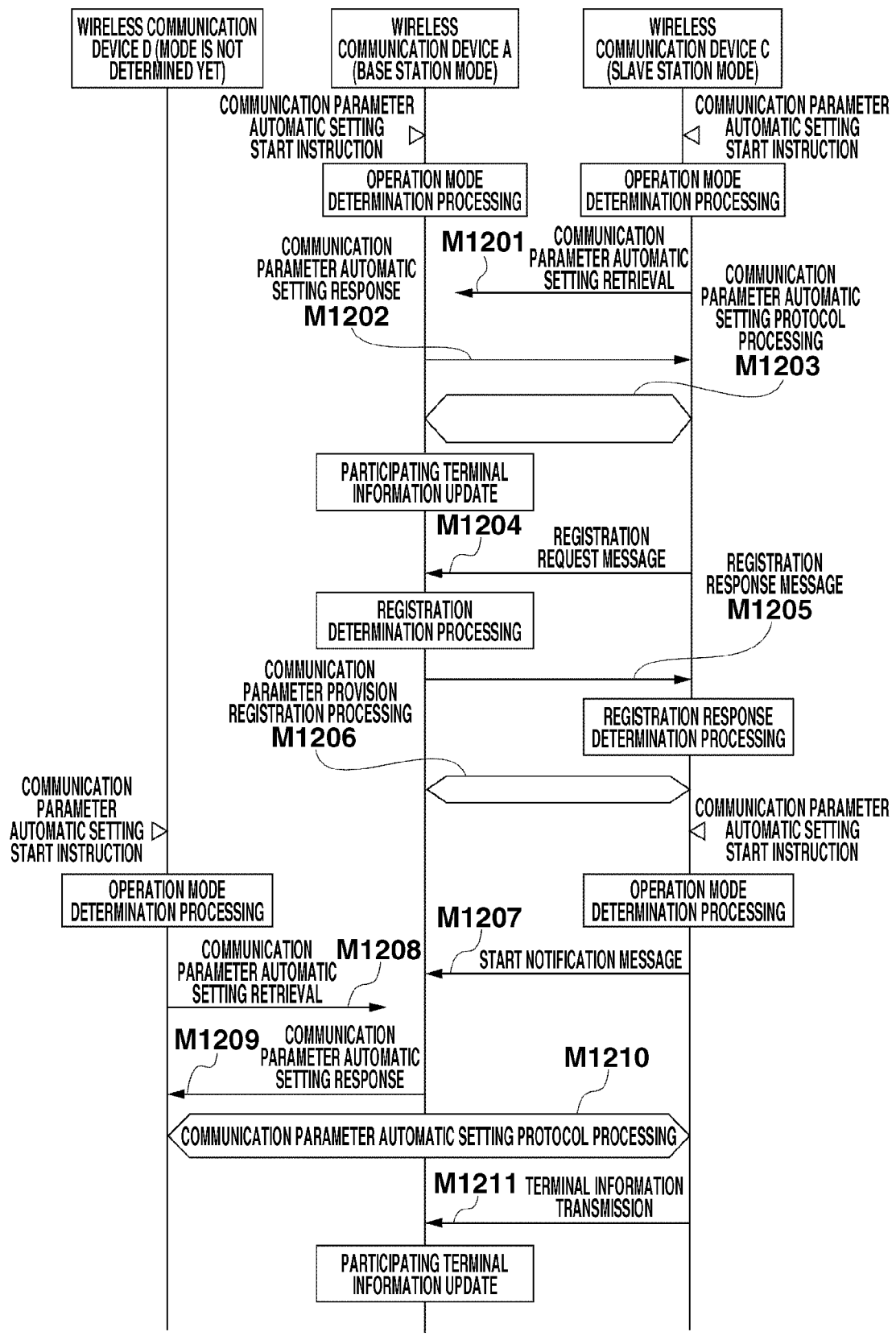
FIG. 12 illustrates a sequence according to the second exemplary embodiment.

FIG. 12 is a sequence diagram illustrating processing of until communication parameter setting is performed between the wireless communication device C and the wireless communication device D after communication parameter setting is performed in the wireless communication device A and the wireless communication device C.

First, the communication parameter automatic setting start instruction is given in the wireless communication device A and the wireless communication device C. When the communication parameter automatic setting start instruction is given, since the operation modes of the wireless communication devices A and C are not determined yet, the both devices perform the processing of step S401→ step S402→ step S409→ step S419. In the present exemplary embodiment, for simplification of description, it is assumed that in the operation mode determination processing of step S419, the operation mode of the wireless communication device A is determined as the base station mode, and the operation mode of the wireless communication device C is determined as the slave station mode.

Since the operation mode of the wireless communication device A is determined as the base station mode, the processing proceeds to step S419→ step S402→ step S403→ . . . → step S407. Since processing subsequent to step S403 is the same as the processing of the wireless communication device A described in the first exemplary embodiment, description thereof will not be repeated.

Since the operation mode of the wireless communication device C is determined as the slave station mode, the processing proceeds to step S419→ step S402→ step S409→ step S410. Since the wireless communication device C is not connected with the wireless network, the processing proceeds to step S420. In step S420, to operate as the receiving device that receives the communication parameters, the communication parameter reception unit 311 is started, and the processing proceeds to step S421. In step S421, the communication parameter automatic setting processing is performed.

The wireless communication device C that has started the communication parameter automatic setting processing first transmits a retrieval request (M1201) for retrieving the wireless communication device at the other end in which communication parameter automatic setting is possible. Specifically, the retrieval request (a probe request) including information representing that communication parameter automatic setting is being performed, is transmitted. The wireless communication device C waits for reception of a retrieval response (a probe response) including information representing that the communication parameter automatic setting is being performed for a predetermined time.

When the retrieval response (M1202) including information representing that the communication parameter automatic setting is being performed is transmitted from the wireless communication device A that has started the communication parameter automatic setting processing in step S406, the wireless communication device C detects the wireless communication device A as the other end of the communication parameter automatic setting. The wireless communication device C performs communication parameter automatic setting protocol processing (M1203) with the wireless communication device A, and receives the communication parameters of the wireless network 100 from the wireless communication device A, which is the providing device.

When the communication parameter automatic setting protocol processing (M1203) is completed, the wireless communication device C is connected with the wireless network 100. After connection with the wireless network 100, the wireless communication device C performs registration processing of registering itself to the wireless communication device A as the communication parameter providing device in step S1101 to step S1103. The flow of the registration processing is the same as step S413 to step S415 of FIG. 4 described in the first exemplary embodiment.

In step S1101, the wireless communication device C transmits a registration request message (M1204) to the wireless communication device A. After receiving the registration request message (M1204), the wireless communication device A performs the processing of FIG. 5, and transmits a registration response message (M1205) to the wireless communication device C. In the present exemplary embodiment, in the registration determination processing of step S502, the processing of FIG. 6 is not performed.

That is, even though a device, other than the wireless communication device C, that functions as the providing device is present, the wireless communication device A transmits the registration response message (M1205) representing that registration as the providing device is possible.

In step S1102, the wireless communication device C confirms a content of the received registration response message (M1205). Since registration is possible (YES in step S1102), the processing proceeds to step S1103. In step S1103, the wireless communication device C starts the communication parameter providing unit 310 and performs registration processing (M1206) to the wireless communication device A as the communication parameter providing device.

As described above, in the present exemplary embodiment, the wireless communication device C participates in the wireless network 100 and then performs registration processing of registering as the communication parameter providing device to the wireless communication device A, which operates as the base station, in advance.

Thereafter, in order for the wireless communication device D to participate in the wireless network 100, the communication parameter automatic setting start instruction is given in the wireless communication device C and the wireless communication device D.

The processing flow of the wireless communication device D is the same as the processing flow of the wireless communication device C, and thus description thereof will not be repeated.

Since the wireless communication device C is operating in the slave station mode, the processing proceeds to step S401→ step S402→ step S409→ step S410. Since the wireless communication device C is connected with the wireless network, the processing proceeds to step S411. Further, since the wireless communication device C is connected with the wireless communication device A that is operating in the base station mode, the processing proceeds to step S416. In step S416, the communication parameter automatic setting processing is performed.

First, the wireless communication device C transmits a start notification message representing a start of the communication parameter automatic setting processing to the wireless communication device A (M1207). When the start notification message is received, the wireless communication device A transmits the retrieval response (M1209) including information representing that communication parameter automatic setting is being performed in response to the communication parameter automatic setting retrieval request (M1208) transmitted from the wireless communication device D.

The wireless communication device D receives the retrieval response including information representing that communication parameter automatic setting is being performed, and thus detects the wireless communication device A as the wireless communication device at the other end of communication parameter automatic setting. After the detection, communication parameter automatic setting protocol processing (M1210) is performed, and the communication parameters are provided from the wireless communication device C to the wireless communication device D through the wireless communication device A. The wireless communication device D is connected with the wireless network 100 by using the provided communication parameters.

Thereafter, in step S417, the wireless communication device C transmits terminal information of the wireless communication device D that has newly participated in the wireless network 100 to the wireless communication device A (M1211), and the wireless communication device A updates terminal information managed by itself. Even though not illustrated, the wireless communication device D participates in the wireless network 100, and then performs registration processing to the wireless communication device A as the communication parameter providing device.

Further, in the present exemplary embodiment, even after providing the communication parameters, the wireless communication device C does not perform processing (processing corresponding to that in step S418) of deregistering as the providing device but continues registration as the communication parameter providing device. The deregistration is performed at any given time, for example, when departing from the wireless network 100 or when the user or the wireless communication device A requests the deregistration.

As described above, in the present exemplary embodiment, when the wireless communication device is connected with the wireless network, registration processing as the communication parameter providing device is performed in advance. As a result, when the communication parameter automatic setting start instruction operation is performed, communication parameter automatic setting can be performed at once. Therefore, in addition to the effect of the first exemplary embodiment, it is possible to reduce time taken for communication parameter setting.

In the above description, the wireless communication device D can operate as both the base station and the slave station, but the present invention can be applied to the case in which the wireless communication device D can operate as only the slave station. Further, it has been described that the wireless communication device D has both the providing function and the receiving function of the communication parameter automatic setting processing, but the present invention can be applied to the case in which the wireless communication device D has only the receiving function. In this case, in the wireless communication device D, the processing of step S1101 to step S1103 of FIG. 11 is omitted.

In the exemplary embodiments, a description of the wireless communication device B is omitted, but in the case in which the communication parameter automatic setting start instruction is given in the wireless communication device B, the same processing flow as the wireless communication device C is performed.

Further, in the exemplary embodiments, it has been described that the communication parameter automatic setting start instruction is given by the operation of the setting button, that is, by the push button configuration (PBC) method of the WPS. However, the present invention is not limited thereto, and the start instruction may be given by a method of inputting a personal identification number (PIN) code and performing authentication.

Further, a network identifier, an encryption method, an encryption key, an authentication method, and an authentication key have been described as examples of the communication parameters. However, different information may be used, and it is needless to say that different information may be included in the communication parameter.

In the exemplary embodiments, the present invention has been described by focusing on the case in which the wireless LAN complying with IEEE 802.11 is applied thereto, but the present invention is not limited thereto. For example, the present invention may employ another wireless communication medium such as wireless USB, MBOA, Bluetooth (registered trademark), UWB, and ZigBee. Further, the present invention may be implemented using a wired communication medium such as a wired LAN.

Here, MBOA stands for Multi Band OFDM Alliance. Further, UWB includes wireless USB, wireless 1394, and WINET.

Further, a recording medium in which a computer program of software for implementing a function of the present exemplary embodiment is recorded may be supplied to a system or a device, and a computer (a central processing unit (CPU) or a micro processing unit (MPU)) of the system or the device may readout and execute the program code stored in the recording medium. It is needless to say that the objects of the present invention can be achieved by this.

As described above, according to the present exemplary embodiments, even the communication device that can operate in both operation modes of a base station mode in which the communication device functions as a base station and a slave station mode in which the communication device functions as a slave station can easily perform communication parameter setting.

Aspects of the present invention can also be realized by a computer of a system or apparatus (or devices such as a CPU or MPU) that reads out and executes a program recorded on a memory device to perform the functions of the above-described exemplary embodiments, and by a method, the steps of which are performed by a computer of a system or apparatus by, for example, reading out and executing a program recorded on a memory device to perform the functions of the above-described exemplary embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the discussed exemplary embodiments. The scope of the following claims is to be accorded the broadest interpretation to encompass all modifications, equivalent structures, and functions.

This application claims priority from Japanese Patent Application No. 2009-118974 filed May 15, 2009, which is hereby incorporated by reference herein in its entirety.

What is claimed is:

1. A communication device capable of operating in both operation modes of a base station mode in which the communication device functions as a base station and a slave station mode in which the communication device functions as a slave station, the communication device comprising:
   a determination unit configured to determine an operation mode of the communication device when an instruction operation by a user to start communication parameter setting is detected; and
   a providing unit configured to provide a communication parameter to a device that requests provision of a communication parameter through a base station in the case that the operation mode is determined by the determination unit to be the slave station mode, and to provide a communication parameter to the requesting device directly in the case that it is determined by the determination unit that the operation mode is the base station mode,
   wherein, in the case that the communication parameter is provided through a base station, the providing unit notifies the base station of a start of communication parameter setting processing.

2. The communication device according to claim 1, further comprising a registration unit configured to perform registration processing in which a base station registers the communication device as a communication parameter providing device for providing the communication parameter through the base station.

3. The communication device according to claim 2, wherein the registration unit is configured to perform the registration processing in the case that the determination unit determines that the operation mode of the communication device is the slave station mode.

4. The communication device according to claim 2, wherein the registration unit is configured to perform the registration processing on completion of connection with a wireless network formed by a base station.

5. The communication device according to claim 1, further comprising a transmission unit configured, in the case that the providing means provides the communication parameter through a base station, to transmit information of a device which is a providing source of the communication parameter, to the base station.

6. The communication device according to claim 1, wherein the providing unit is configured to provide a communication parameter of a wireless network connected with the communication device.

7. A method for controlling a communication device capable of operating in both operation modes of a base station mode in which the communication device functions as a base station and a slave station mode in which the communication device functions as a slave station, the method comprising:
   determining an operation mode of the communication device when an instruction operation given by a user to start communication parameter setting is detected; and
   providing, in the case that the determined operation mode is the slave station mode, a communication parameter to a device that requests provision of a communication parameter through a base station, and providing, in the case that the determined operation mode is the base station mode, a communication parameter to the requesting device directly,
   wherein, in the case that the communication parameter is provided through a base station, the providing unit notifies the base station of a start of communication parameter setting processing.

8. A computer-readable storage medium storing computer-executable instructions for operating a computer as the communication device according to claim 1.

9. A communication device capable of operating in both operation modes of a base station mode in which the communication device functions as a base station and a slave station mode in which the communication device functions as a slave station, the communication device characterized by comprising:
   a receiving unit configured to receive an instruction operation by a user to start communication parameter setting;
   a determination unit configured to determine an operation mode of the communication device; and
   a providing unit configured to provide a communication parameter for a network formed by a base station to another device through the base station in the case that the operation mode is determined by the determination unit to be the slave station mode, and to provide a communication parameter for a network formed by the communication device directly to another device in the case that the operation mode is determined by the determination unit means to be the base station mode.

10. The communication device according to claim 9, further comprising a registration unit configured to perform registration processing in which a base station registers the communication device as a communication parameter providing device for providing the communication parameter through the base station.

11. The communication device according to claim 10, wherein the registration unit is configured to perform the registration processing in the case that the determination unit determines that the operation mode of the communication device is the slave station mode.

12. The communication device according to claim 10, wherein the registration unit is configured to perform the registration processing on completion of connection with a wireless network formed by a base station.

13. The communication device according to claim 9, wherein, in the case that the communication parameter is provided through a base station, the providing unit notifies the base station of a start of communication parameter setting processing.

14. The communication device according to claim 9, further comprising a transmission unit configured, in the case that the providing unit provides the communication parameter through a base station, to transmit information of a device which is a providing source of the communication parameter, to the base station.

15. The communication device according to claim 9, wherein the communication parameter is a parameter for a wireless network complying with IEEE 802.11.

16. The communication device according to claim 9, wherein the communication parameter includes at least one of a network identifier, an encryption method, an encryption key, an authentication method, and an authentication key.

17. A computer-readable storage medium storing computer-executable instructions for operating a computer as the communication device according to claim 9.

18. A method for controlling a communication device capable of operating in both operation modes of a base station mode in which the communication device functions as a base station and a slave station mode in which the communication device functions as a slave station, the method comprising:

receiving an instruction operation by a user to start communication parameter setting;

determining an operation mode of the communication device; and providing a communication parameter for a network formed by a base station to another device through the base station in the case that the operation mode is determined to be the slave station mode, and to provide a communication parameter for a network formed by the communication device directly to another device in the case that the operation mode is determined to be the base station mode.

* * * * *